US007796020B2

(12) United States Patent
Suzuki

(10) Patent No.: US 7,796,020 B2
(45) Date of Patent: Sep. 14, 2010

(54) WARNING APPARATUS FOR USE IN VEHICLE

(75) Inventor: Tadao Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 323 days.

(21) Appl. No.: 12/081,799

(22) Filed: Apr. 22, 2008

(65) Prior Publication Data

US 2008/0266072 A1 Oct. 30, 2008

(30) Foreign Application Priority Data

Apr. 25, 2007 (JP) ............................ 2007-116129

(51) Int. Cl.
*B60Q 1/00* (2006.01)

(52) U.S. Cl. .......................... 340/438; 340/435; 701/45

(58) Field of Classification Search ................. 340/438, 340/435, 436, 439; 701/36, 45
See application file for complete search history.

(56) References Cited

U.S. PATENT DOCUMENTS

| | | | | |
|---|---|---|---|---|
| 6,092,005 | A | 7/2000 | Okada | |
| 6,092,014 | A | 7/2000 | Okada | |
| 7,072,753 | B2 * | 7/2006 | Eberle et al. | 701/45 |
| 7,349,782 | B2 * | 3/2008 | Churchill et al. | 701/45 |
| 7,468,653 | B2 * | 12/2008 | Takahashi | 340/435 |

FOREIGN PATENT DOCUMENTS

| | | |
|---|---|---|
| JP | A-05-054291 | 3/1993 |
| JP | A-11-120488 | 4/1999 |
| JP | A-2002-170198 | 6/2002 |
| JP | A-2002-329300 | 11/2002 |
| JP | A-2002-373396 | 12/2002 |
| JP | A-2005-247265 | 9/2005 |
| JP | A-2005-316889 | 11/2005 |

* cited by examiner

*Primary Examiner*—John A Tweel, Jr.
(74) *Attorney, Agent, or Firm*—Posz Law Group, PLC

(57) ABSTRACT

A warning apparatus acquires traffic light information from outside of a vehicle through a traffic information acquisition unit, and travel information regarding a travel condition of the vehicle through a travel information acquisition unit. Then, the warning apparatus determines whether an intersection is safely passable based on the traffic light information and the travel information. When the intersection is not safely passable, the warning apparatus searches similar traffic light information and similar travel information relative to current traffic light information and current travel information by checking records of past driving operation in a storage unit. Then, the warning apparatus predicts a driving operation of a driver when the driver is warned for determining the warning contents based on the operation information in association with the similar traffic light information and the similar travel information.

8 Claims, 4 Drawing Sheets

WARNING APPARATUS FOR USE IN VEHICLE

CROSS REFERENCE TO RELATED APPLICATION

The present application is based on and claims the benefit of priority of Japanese Patent Application No. 2007-116129 filed on Apr. 25, 2007, the disclosure of which is incorporated herein by reference.

FIELD OF THE INVENTION

The present disclosure generally relates to a warning apparatus for use in a vehicle.

BACKGROUND INFORMATION

Conventionally, an apparatus capable of providing a driver of a vehicle with a support of safe driving is disclosed, for example, in Japanese patent document JP-A-H11-120488.

In the description of the above document, whether an unsafe operation is observed in a driving operation of the driver is determined based on traffic control information such as traffic light parameters, traffic regulations and the like as well as time of driving, map data, and information from vehicle sensors that sense travel condition of the vehicle such as braking, acceleration, speed and the like, and the unsafe operation is accumulated in association with time, position and the like for notifying the driver of a situation of the unsafe operation. The apparatus lets the driver of the vehicle recognize what kind of unsafe operations are observed in his/her driving.

The apparatus of the above patent document only makes the driver recognize what kind of the unsafe operation is frequently observed in his/her driving, without providing a support for the driver who is actually driving the vehicle in a suitable manner tailored for respective drivers.

SUMMARY OF THE INVENTION

In view of the above and other problems, the present invention provides a warning apparatus that provides driving support for improving safety of driving in a suitable manner tailored for respective drivers when the driver is actually driving a vehicle.

The warning apparatus of the present invention includes: a traffic information acquisition unit capable of acquiring traffic information of outside of the vehicle; a travel information acquisition unit capable of acquiring travel information regarding a travel condition of the vehicle; an operation information acquisition unit capable of acquiring operation information regarding a driving operation (by a driver) of the vehicle; a storage unit capable of storing the traffic information in association with the travel information at a time of acquiring the traffic information and the operation information representative of the driving operation on the travel condition at the time of acquiring the traffic information; and a warning contents determination unit capable of determining warning contents according to the operation information in association with the traffic information and travel information. When the traffic information is acquired by the traffic information acquisition unit, the determination unit determines the warning contents after searching similar traffic information and similar travel information from information stored in the storage unit by referring to the acquired traffic information and the travel information at the time of acquiring the traffic information.

The warning apparatus of the present invention stores the traffic information, travel information, operation information in a mutually associated manner in the storage unit, and searches the similar traffic and travel information from the information in the storage unit by referring to the acquired traffic and travel information for predicting the driver's response in terms of a driving operation under the current condition characterized by the acquired traffic and travel information. Therefore, the predicted driving operation of the driver is reflected to determining procedure of the warning contents prior to actually providing the warning for the driver. As a result, the warning apparatus achieves an improvement of the quality of driving support provided for the driver.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
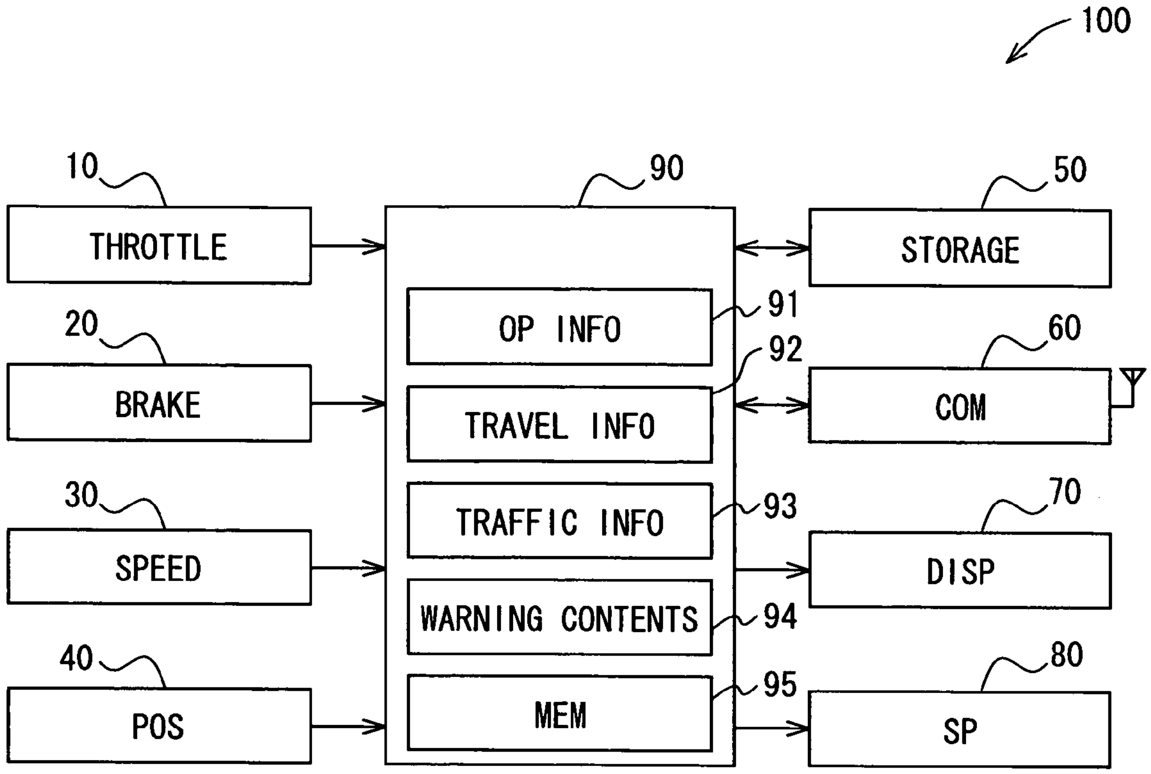
FIG. 1 shows a block diagram of configuration of a vehicle warning system in a first embodiment of the present invention.

Embodiments of the present invention are explained in the following with reference to the drawing.

First Embodiment

Figure 2:
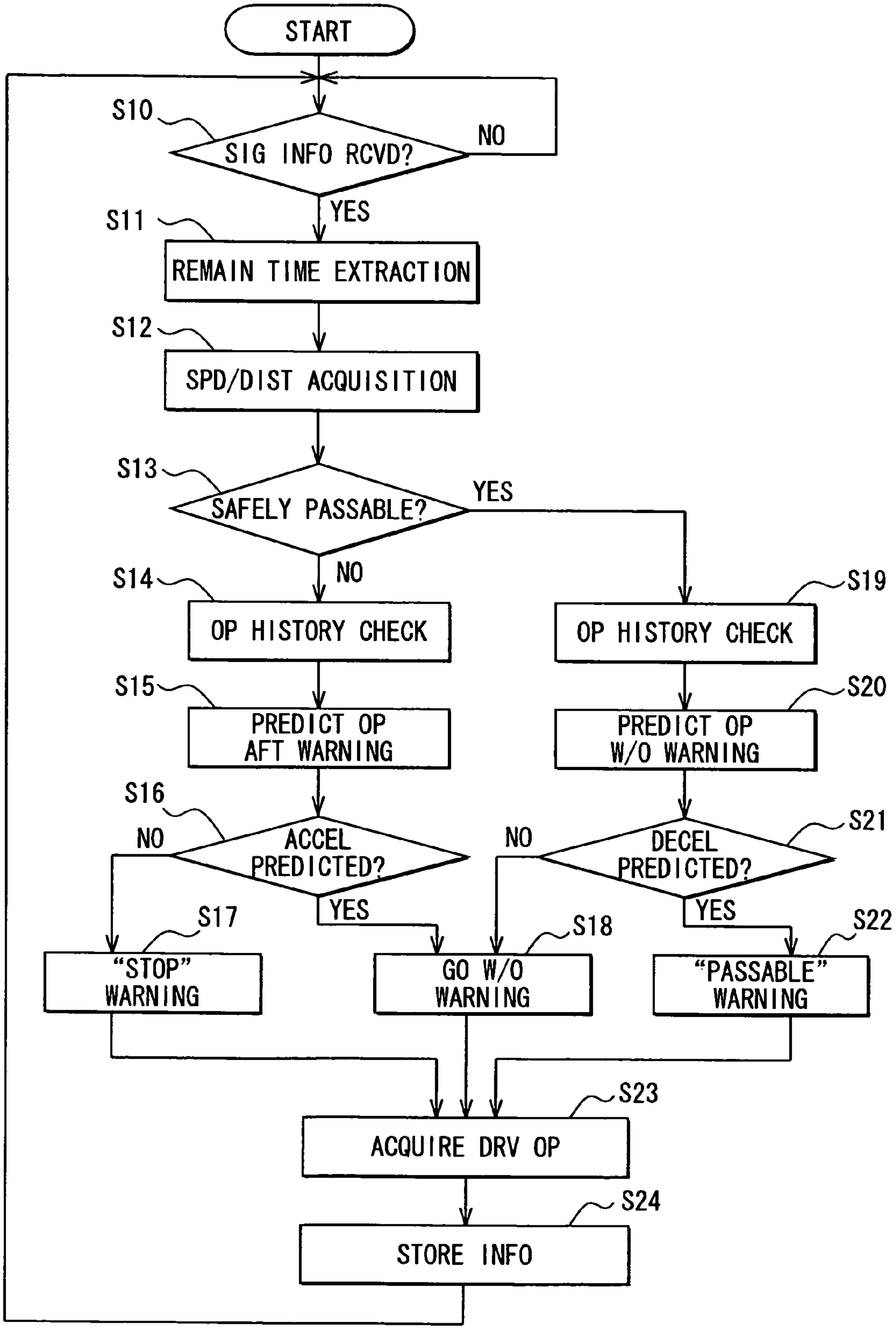
FIG. 2 shows a flowchart of processing of the vehicle warning system in the first embodiment of the present invention.

At first a form of the first embodiment is explained. FIG. 1 is a block diagram showing the outline configuration of a vehicle warning system 100 in the first embodiment of the present invention. FIG. 2 is a flowchart showing processing of the vehicle warning system 100 in the first embodiment of the present invention.

The Vehicle warning system 100 in the present embodiment includes a control unit 90 connected to a throttle sensor 10, a brakes sensor 20, a vehicle speed sensor 30, a position sensing device 40, a storage device 50, a communications equipment 60, a display unit 70, a speaker 80 as shown in FIG. 1. The vehicle warning system 100 is installed in a vehicle, and the safe driving at the crossing is supported for the driver of the vehicle. The vehicle warning system 100 of the present invention considers the control (a driving operation, or a driving habit) of the vehicle driver in the past, and the safe driving at the crossing is supported in particular.

The throttle sensor 10 detects acceleration operation and deceleration operation by the driver of the vehicle, and the stepping forward displacement magnitude of the accelerator pedal is detected, and a signal (operation information) showing the detection result is output to the control unit 90. In addition, the stepping forward displacement magnitude of the accelerator pedal which the throttle sensor 10 detects supports opening of the throttle valve.

The brakes sensor 20 detects deceleration operation by the vehicle driver by detecting the stepping forward state of the brake pedal by the driver of the vehicle, and a signal (operation information) showing the detection result is output to the control unit 90. For example, a signal showing hitting the brakes will be output to the control unit 90 when the stepping forward speed (operation speed) of the brake pedal is fast.

The vehicle speed sensor 30 is installed in the axles of the subject vehicle, and traveling speed of the subject vehicle is detected, and a signal showing the detection result is output to the control unit 90.

The position sensing device 40 detects a position of the subject vehicle. The device 40 has a geomagnetism sensor detecting the direction of the progress direction of the subject vehicle, a gyro sensor detecting the angular speed around the vertical direction of the subject vehicle for detecting the progress direction of the subject vehicle, a range sensor detecting a travel distance of the subject vehicle and the electric wave from the GPS satellite, and GPS receivers for Global Positioning System (GPS) detecting a current position of the subject vehicle. The position sensing device 40 outputs a signal showing a detected position of the subject vehicle to the control unit 90. In addition, each of these sensors has the error of the different property for mutually correcting and supplementing the errors with each other. Further, it may be possible to constitute the device 40 with some of the above sensors depending on the accuracy of each of the sensors.

The storage device 50 consists of the storage medium such as a memory card or the hard disk. To the storage device 50, various data such as text data, image data, the audio data indicated by a user are memorized. The control database (on the pretence of the control record) to grasp past control (a driving habit) of the vehicle driver is memorized in particular in the storage device 50 in the present embodiment, for storage and/or update under instructions from the control unit 90. The records of the control performed by the driver of the vehicle includes signal information (traffic information) to be mentioned later, the travel information of the vehicle when the signal information was acquired, operation information showing the control of the driver of the vehicle performed in a travel condition at the time of signal information acquisition, and warning contents memorized in an associative manner.

The communications equipment 60 performs road-vehicle-communication with a road-side device (not shown) installed at each of the crossings, and receives signal information (traffic information) that includes various signals such as a signal showing the position of the traffic signal, the remaining time of the green light of the signal and the like.

The display unit 70 has, for example, a liquid crystal display, and displays an image showing a warning under instructions from the control unit 90. In addition, as for the speaker 80, a sound showing a warning is announced under instructions from the control unit 90.

The control unit 90 which has above parts connected thereto is implemented as a normal computer, and bus line is provided in the unit 90 for connecting a well-known CPU, ROM, RAM, input/output and other parts. Further, the control unit 90 has function parts such as an operation information acquisition part 91, a travel information acquisition part 92, a traffic information acquisition part 93, a warning contents determination part 94, and a memory 95.

The operation information acquisition part (operation information acquisition unit) 91 acquires operation information about the control including the acceleration and the deceleration operation of the vehicle driver from the throttle sensor 10 and the brakes sensor 20.

The travel information acquisition part (travel information acquisition unit) 92 acquires travel information about the travel condition including the speed of the vehicle and the position of the vehicle from the vehicle speed sensor 30 and the position sensing device 40. In addition, the travel information acquisition part 92 has a calculation part to calculate the distance from the current position of the vehicle to a traffic signal which is a part of the travel information. The distance between the current position and the traffic signal is calculated in the calculation part based on a relative position defined by the position of the traffic signal and the current position of the vehicle respectively acquired from the position sensing device 40 and the communications equipment 60. Further, the distance from the current position of the vehicle to the traffic signal may be named merely as a "distance" in the following.

The traffic information acquisition part (traffic information acquisition unit) 93 acquires the signal information that is outside traffic information of the vehicle from the communications equipment 60.

The warning contents determination part (warning contents determination unit) 94 determines warning contents. That is, for example, when the signal information has been acquired, signal information and travel information are searched from the storage device 50 based on the similarity to the acquired signal information and the travel information at the time of signal information acquisition, and the operation information associated with the similar signal information and travel information found in the search is used to determine the warning contents.

The memory 95 (storage unit) memorizes the control record that associates the signal information, the travel information at the time of signal information acquisition, and the operation information showing control (driving operation) accomplished in the travel condition when the signal information was acquired, with the warning contents to the storage device 50.

With reference to FIG. 2, operation of the vehicle warning system 100 is explained in the present embodiment. In addition, the flowchart as shown in FIG. 2 is carried out when a vehicle is running.

At first, it is determined whether the traffic information acquisition part 93 of the control unit 90 received the signal information as the traffic information in step S10 when the communications equipment 60 performs road-vehicle-communication with a road-side device installed at each of the crossings, and there comes step S11 subsequently when it was determined that the signal information has been received. Processing in step S10 is repeated when it was determined that the signal information has not been received.

In step S11, the traffic information acquisition part 93 of the control unit 90 extracts signals (traffic information) including a signal showing the position of the traffic signal and a signal showing the remaining time of the green light from the signal information received in step S10. In step S12, the travel information acquisition part 92 of the control unit 90 acquires a signal showing the speed (subject vehicle speed) of the vehicle output from the vehicle speed sensor 30. Further, the distance from the current position of the vehicle to the traffic signal is acquired. The distance between the current position and the traffic signal is calculated based on a relative position defined by the position of the traffic signal and the current position of the vehicle respectively acquired from the position sensing device 40 and the communications equipment 60.

Then, a determination whether or not a crossing can be passed safely is performed (warning necessity calculation unit) based on the remaining time of the green light in the traffic signal, the subject vehicle's speed and the relative position with the traffic signal in step S13 by the warning contents determination part 94 of the control unit 90. When it was determined that the crossing cannot be passed safely, the process proceeds to step S14 subsequently. The process proceeds to step S19 subsequently when it was determined that the crossing can be passed safely.

For example, it is determined as the case that the crossing can be passed safely before the signal turns to red if the vehicle just travels without slowing down. On the other hand, it is determined as the case that the crossing cannot be passed before the signal turns to red at a current speed due to little remaining time of the green light.

In addition, based on the remaining time of the green light (traffic information) and based on the vehicle speed/distance (travel information), performing a warning is thought about to support safe driving for a vehicle driver in either case, that is, when the crossing can be passed safely, or not safely. However, for example, the vehicle driver may respond to the warning in the following manner. That is, there is a driver who suddenly put brakes, a driver who let the speed of the vehicle accelerate at a stretch or a driver who operates brakes from the largely remote position from the crossing when a warning showing the remaining time of the green light is provided. When a warning is provided based on the remaining time of the green light (traffic information) and vehicle speed/distance (travel information) without considering the control (a driving habit) of the vehicle driver in the past, it may lead to an unfavorable result.

Therefore, in step S14, the warning contents determination part 94 of the control unit 90 refers to a control record memorized to the storage device 50 to perform the warning that considered past control (a driving habit) of the vehicle driver. In other words, the warning contents determination part 94 searches past travel information and past signal information from records memorized to the storage device 50 based on similarity to current signal information acquired by the traffic information acquisition part 93 and current travel information acquired at the time when the traffic information was acquired by the travel information acquisition part 92.

Then, in step S15, the warning contents determination part 94 of the control unit 90 predicts control by the driver from operation information associated with similar signal information and travel information among control records memorized to the storage device 50, and from operation information when a warning was provided. In other words, the warning contents determination part 94 predicts what kind of control the vehicle driver performs based on the present status (the remaining time of the green light, vehicle speed, distance) of the vehicle and a warning being provided for the driver. When the control that the vehicle driver performs is predicted to be an acceleration operation in step S16, the warning contents determination part 94 of the control unit 90 proceeds to step S18. Or, step S17 comes subsequently when the control that the driver performs is not predicted to be the acceleration operation in step S16.

In step S17, the warning contents determination part 94 of the control unit 90 determines warning contents, and uses the display unit 70, the speaker 80 to provide a warning "stop" or the like. This is because the driver is predicted not to accelerate the vehicle to pass the crossing (i.e., the traffic signal) forcefully at the present status (the remaining time of the green light, vehicle speed, distance) of the vehicle after having the warning ("stop") in view of the records of the past control (records of control).

On the other hand, in step S18, the warning contents determination part 94 of the control unit 90 does not provide a warning. In other words, the warning contents determination part 94 determines that "not giving a warning" is the contents of warning. This is because the driver is predicted to accelerate the vehicle to pass the crossing (i.e., the traffic signal) forcefully at the present status (the remaining time of the green light, vehicle speed, distance) of the vehicle after the warning ("stop") in view of the records of the past control (records of control). In other words, based on a prediction that a warning may not be a preferable support for the driver at the current situation, the warning is not provided contrary to a common warning provision scheme. In addition, the warning contents determined in step S17 and step S18 are memorized to the storage device 50. Further, the warning contents may be stored in association with the situation (the remaining time of the green light, vehicle speed, distance) and the control (driving operation) of the vehicle when memorized to the storage device 50.

In step S19, the warning contents determination part 94 of the control unit 90 refers to the control record that is memorized to the storage device 50 to perform the warning that considers past control (a driving habit) of the vehicle driver. In other words, the warning contents determination part 94 searches signal information and travel information similar to current signal information acquired with the traffic information acquisition part 93 and current travel information acquired with the travel information acquisition part 92 (i.e., travel information at a time when the traffic information is acquired) from control records memorized to the storage device 50.

Then, in step S20, the warning contents determination part 94 of the control unit 90 predicts control by the driver from operation information associated with similar signal information and travel information among control records memorized to the storage device 50, and from operation information when a warning was not provided. In other words, the warning contents determination part 94 predicts what kind of control the vehicle driver performs based on the present status (the remaining time of the green light, vehicle speed, distance) of the vehicle without a warning being provided for the driver. When the control that the vehicle driver performs is predicted to be a deceleration operation in step S21, the warning contents determination part 94 of the control unit 90 proceeds to step S22. Or, step S18 comes subsequently when the control that the driver performs is not predicted to be the deceleration operation in step S21.

In step S18, the warning contents determination part 94 of the control unit 90 does not provide a warning. In other words, the warning contents determination part 94 determines not to give a warning as warning contents. This is because the driver is predicted not to perform an unnecessary deceleration operation when the warning is provided at the present status (the remaining time of the green light, vehicle speed, distance) of the vehicle with no warning provided in view of the records of the past control (records of control).

On the other hand, in step S22, the warning contents determination part 94 of the control unit 90 provides a "passable" warning (an instruction to encourage the driver to go without stopping at the crossing at the current speed) from the display unit 70 and the speaker 80. This is because the driver is predicted to perform an unnecessary deceleration operation when the warning is provided at the present status (the remaining time of the green light, vehicle speed, distance) of the vehicle with no warning provided in view of the records of the past control (records of control). In other words, traveling without warning may have higher possibility to lead to non-preferable support for the driver, and the warning is daringly provided. In addition, the warning contents determined in step S22 are memorized to the storage device 50. The warning contents may be associated with the situation (the remaining time of the green light, vehicle speed, distance) and the control (driving operation) of the vehicle and when they are memorized to the storage device 50.

Then, in step S23, the operation information acquisition part 91 of the control unit 90 acquires operation information showing control performed in a travel condition where the current signal information was acquired from the throttle sensor 10 and the brakes sensor 20. In other words, the operation information acquisition part 91 acquires operation information showing the control of the actual vehicle driver when a crossing (i.e., the traffic signal) is passed.

In step S24, the memory 95 of the control unit 90 associates current signal information, current travel condition at a time when the current signal information is acquired, and operation information showing the control performed in the travel condition when the current signal information is acquired with the warning contents currently determined for being memorized to the storage device 50.

Therefore, in the present embodiment, as described above, when the driver actually drives the vehicle, a driving support suitable for the driver of vehicle can be provided according to the remaining time of the green light of the traffic signal.

In addition, though an example of calculating the distance from a vehicle to a signal based on the position of the traffic signal from the communications equipment 60 is given in the above-mentioned embodiment, the distance may be calculated in a different manner. For example, when a map data storage device capable of memorizing road data including signals showing the positions of the traffic signals and map data including spot search data or the like on a writable medium such as a memory card, a hard disk or the like is available, a signal showing a position of the traffic signal may be acquired from the map data storage device.

Further, though the past warning and/or the passability of the traffic signal is considered in the present embodiment, the warning contents may be determined solely on the similarity search of the signal information and the traffic information at the time of signal information acquisition.

That is, the consideration of the past warning for determining the warning contents may be performed to increase the degree of appropriateness of the driving support for the driver, because the driving operation may be changed according to the warning contents.

Furthermore, the signal passability whether the traffic signal is safely passable is appropriately reflected to the warning contents when the safe driving support is provided in the present embodiment.

Furthermore, the warning contents may be exclusively used to determine the warning contents in addition to similar signal information and similar travel information.

Furthermore, the necessity of a warning based on the travel information at the time of the traffic information acquisition as described above is used to determine the warning contents, thereby enabling a more appropriately tailored safe driving support for the driver.

Furthermore, the control unit 90 may manage the memory contents (a control record) of the storage device 50. That is, the control unit 90 refers to the oldest control record in the storage device 50 at a scheduled timing (for example, the vehicle engine start time or the like). Then, the control unit 90 compares the date and time when the oldest control record was memorized with the current date and time, and the control record is deleted when the oldest control record was memorized before an appointed period from the current date and time. Because a comparatively new control record is referred to in this manner, the warning contents can be determined more preferably.

Second Embodiment

Figure 3:
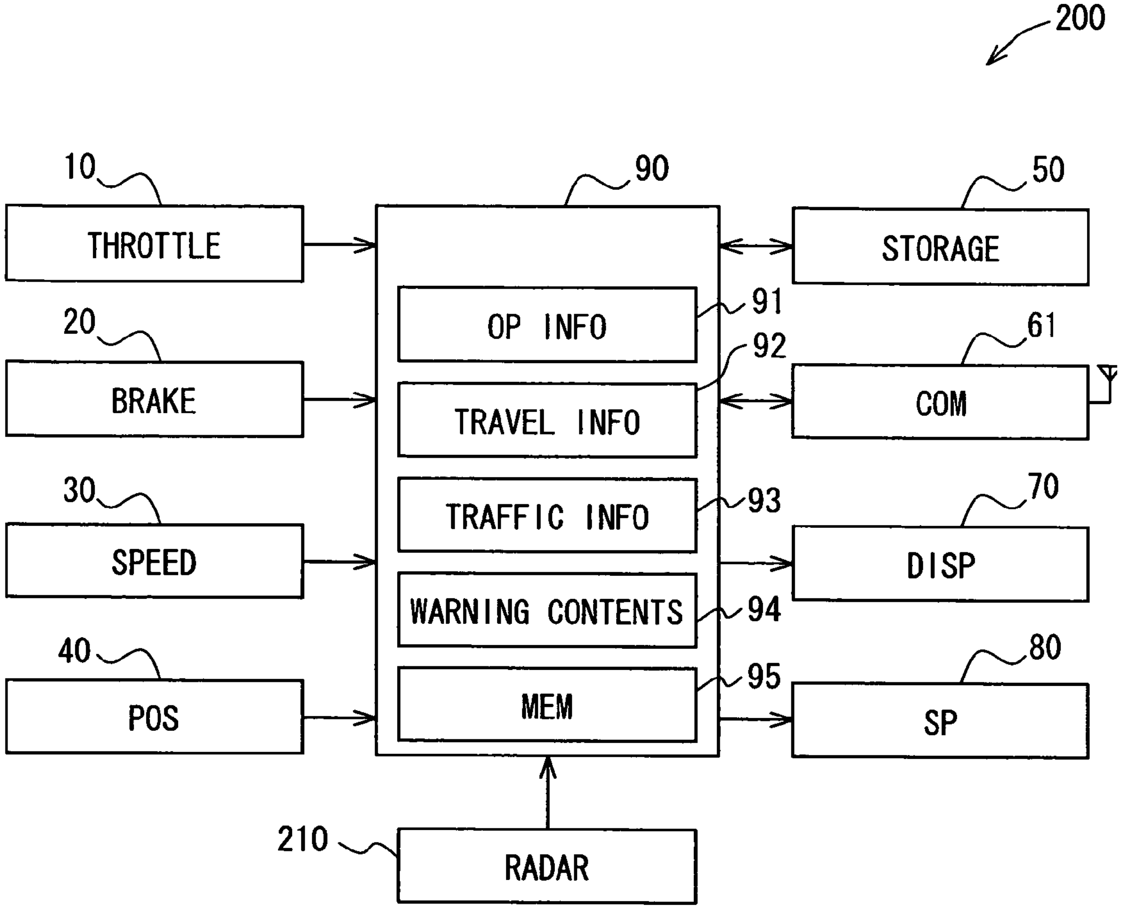
FIG. 3 shows a block diagram of configuration of the vehicle warning system in a second embodiment of the present invention.
Figure 4:
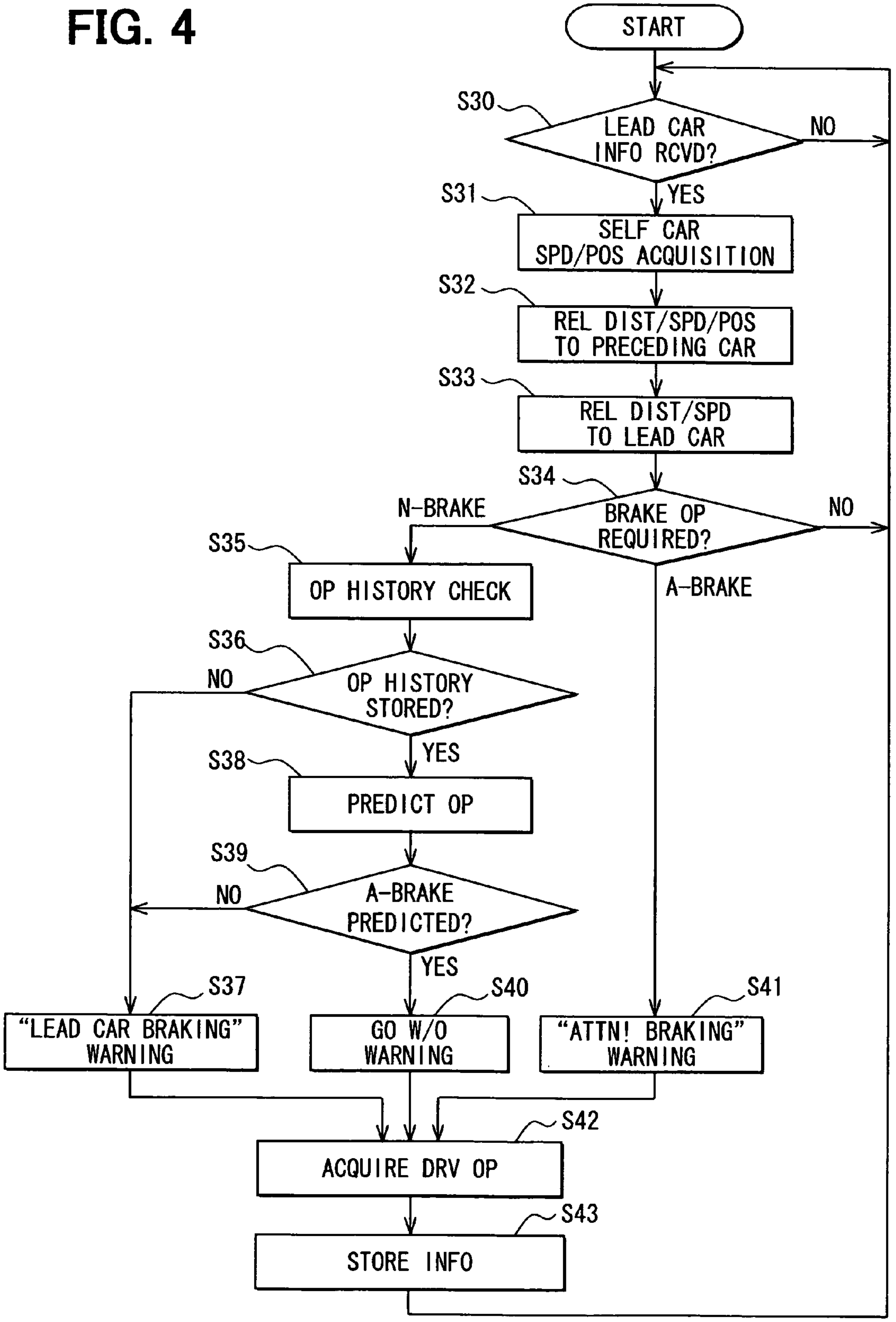
FIG. 4 shows a flowchart of processing of the vehicle warning system in the second embodiment of the present invention.

A form of the second embodiment of the present invention is explained next. FIG. 3 is a block diagram showing the configuration of the vehicle warning system in the second embodiment of the present invention, and FIG. 4 is a flowchart showing the operation of the vehicle warning system in the form of the second embodiment of the present invention.

In the following description, the difference of the second embodiment from the first embodiment, that is, the use of radar, the braking of a lead vehicle serving as the traffic information with other features, is mainly described.

A vehicle warning system 200 in the present embodiment includes the throttle sensor 10, the brakes sensor 20, the vehicle speed sensor 30, the position sensing device 40, the storage device 50, a communications equipment 61, the display unit 70, the speaker 80, a radar system 210 and the control unit 90 connected thereto as shown in FIG. 3. The vehicle warning system 200 is installed on a vehicle, and safe driving is supported for the driver of the vehicle by the system 200. In particular, the vehicle warning system 200 of the present invention considers the control (a driving habit) of the vehicle driver in the past for safety against the lead vehicle.

The inter-vehicle communication is performed between a lead vehicle and the subject vehicle, and the communications equipment 61 receives the traffic information outside of the subject vehicle including the position of the lead vehicle and the braking state. When there is a lead vehicle, the vehicle driver operates brakes by confirming (viewing) the braking state (the lighting of the stop-lamp) of the lead vehicle. In particular, brakes are operated, for example, in association with braking of the vehicle ahead of the immediate lead vehicle in the highways, because it may be too late to operate the brakes after confirming braking of the immediate lead vehicle. However, there may be cases that the immediate lead vehicle such as a large truck or the like prevents the driver of the subject vehicle from viewing braking of the vehicles ahead of the immediate lead vehicle. Therefore, the braking state of the vehicle ahead of the immediate lead vehicle may be grasped by receiving the traffic information outside of the subject vehicle including the position and the braking state of the lead vehicle with the communications equipment 61.

As for the radar system 210, a scan-type laser radar can be adopted and is installed in a bumper part or the neighborhood in a front part of the subject vehicle. The radar system 210 sends out a laser beam to the vehicle front, and an object (lead vehicles) which is in the predetermined range of the vehicle front is detected by the reflected beam. The radar system 210 outputs, to the control unit 90, lead vehicle information including various data (a relative distance to the lead vehicle, the relative speed, the position (driving lane) of the immediate lead vehicle) about a detected object. In addition, the detailed explanation is omitted because the calculation method of the lead vehicle information that includes a relative distance to the immediate lead vehicle, relative speed, the position (a driving lane) of the immediate lead vehicle is well-known technology. Further, though an example calculating the lead vehicle information that includes a relative distance to the immediate lead vehicle, relative speed, the position (a driving lane) of the immediate lead vehicle by the radar system 210 is described in the present embodiment, there may be a different implementation. That is, the control unit 90 may calculate the relative distance and the like based on a signal from the radar system 210.

In addition, operation information acquisition part (operation information acquisition unit) 91 of the control unit 90 in the present embodiment acquires operation information about the control including the braking operation of the vehicle driver from the brakes sensor 20.

Travel information acquisition part (travel information acquisition unit) 92 acquires the speed and position of the subject vehicle as well as travel information including the position of an immediate lead vehicle and the relative distance and relative speed to the immediate lead vehicle from the vehicle speed sensor 30, the position sensing device 40, the radar system 210.

Traffic information acquisition part (traffic information acquisition unit) 93 acquires, through the inter-vehicle communication by the communications equipment 61, the traffic information outside of the subject vehicle including the position and the braking state of the lead vehicle. In addition, the communications equipment 61 in the present embodiment performs the inter-vehicle communication, unlike the communications equipment 60 in the above-mentioned embodiment, including communications with the roadside device relaying the information from other vehicles. In addition, other communications such as the road-vehicle-communication may be performed at the same time.

For example, when traffic information was acquired, traffic information and travel information respectively similar to acquired traffic information and travel information acquired at the time of signal information acquisition are searched from the storage device 50, and operation information associated with the similar signal information and travel information is used by warning contents determination part (warning contents determination unit) 94 for determining the warning contents.

The memory 95 memorizes, to the storage device 50, the control record that associates the traffic information, the travel information at the time of traffic information acquisition, and the operation information showing control (driving operation) performed in the travel condition at the time when the traffic information was acquired with the warning contents.

The operation of the vehicle warning system 200 in the present embodiment is described with reference to FIG. 4. The operation represented by the flowchart as shown in FIG. 4 is carried out when a vehicle is traveling.

At first, it is determined whether the traffic information acquisition part 93 of the control unit 90 has received the position (a driving lane) of the lead vehicle and traffic information including the braking state in step S30 through the inter-vehicle communication with the lead vehicle by the communications equipment 61, and step S31 comes subsequently when it is determined that the acquisition part 31 has received the traffic information, or processing in step S30 is repeated if it is determined that the acquisition part 31 has not received the signal information.

In step S31, the travel information acquisition part 92 of the control unit 90 acquires a signal showing the speed and position of the subject vehicle from the vehicle speed sensor 30 and the position sensing device 40.

In step S32, the travel information acquisition part 92 of the control unit 90 acquires, from the radar system 210, the lead vehicle information including the relative distance and relative speed to the immediate lead vehicle, together with the position (a driving lane) of the immediate lead vehicle.

In step S33, the travel information acquisition part 92 of the control unit 90 calculates and determines the relative distance and relative speed to the lead vehicle which has output the traffic information, based on the traffic information acquired from the communications equipment 61 and the speed and position of the subject vehicle from the vehicle speed sensor 30 and the position sensing device 40.

In step S34, the warning contents determination part 94 of the control unit 90 determines whether the braking operation is required based on information acquired in steps S31-S33. In other words, whether a warning is required or not is determined in step S34 (the step corresponds to warning necessity calculation unit). When it is determined that normal braking operation is required, the process proceeds to step S35 subsequently, or the process proceeds to step S41 subsequently when abrupt braking operation is determined to be required. When braking operation is determined not required, the process returns to step S30. Therefore, the warning contents are determined only for the cases that require braking as described above by determining the necessity of braking, the operation of the warning system 200 becomes preferable.

The abrupt braking is determined to be required when, for example, both of the lead vehicle which has transmitted the traffic information and the immediate lead vehicle are traveling in a driving lane same as the subject vehicle with the inter-vehicle distance between the subject vehicle and the lead vehicle is short or in similar situations. On the other hand, the normal braking is determined to be required when, for example, both of the lead vehicle which has transmitted the traffic information and the immediate lead vehicle are traveling in a driving lane same as the subject vehicle with the inter-vehicle distance between the subject vehicle and the immediate lead vehicle is relatively long or in similar situations. Further, the braking is determined as not required when, for example, both of the lead vehicle which has transmitted the traffic information and the immediate lead vehicle are traveling in a driving lane different from the subject vehicle or in similar situations.

In addition, a determination in step S34 that braking is not required should not trigger a warning. Further, a determination that the normal braking is required should trigger a warning that promotes the normal braking, and a determination that the abrupt braking is required should trigger a warning that promotes the abrupt braking.

However, the vehicle driver may perform the abrupt braking if the warning of braking of the lead vehicle is provided for the situation that the normal braking is required. In other words, the abrupt braking may be performed when it (the abrupt braking) is not required. That is, it may not be appropriate, for the situation that requires the normal braking, to provide the warning without considering past driving operation of the drive or the like.

Therefore, in step S41, the warning contents determination part 94 of control circuit 90 determines the warning contents (contents showing that performing the abrupt braking operation is required), and provides the warning of, for example, “Attention! Braking required!” from the display unit 70 and the speaker 80. The warning may be provided additionally from, for example, a vibrator. In addition, the warning contents determined in step S41 may be memorized to the storage device 50. The warning contents may be associated with the vehicle condition and the driving operation of the vehicle when memorized to the storage device 50.

On the other hand, the warning contents determination part 94 of the control unit 90 refers to the control record that is memorized to the storage device 50 to perform the warning that considered the past control (a driving habit) of the vehicle driver in step S35 when it is determined that the normal braking operation is required in step S34.

In step S36, the warning contents determination part 94 of the control unit 90 determines whether there is a control record in the storage device 50, and proceeds to step S38 when a control record is found, or, proceeds to step S37 when a control record is not found.

In step S37, the warning contents determination part 94 of the control unit 90 determines the warning contents (contents showing that braking operation is required), and uses determined the display unit 70 and the speaker 80 to provide the warning of, for example, "Lead vehicle braking" or the like. In addition, vibrators or the like may be used as well as the display unit 70 and the speaker 80 for providing the warning.

In step S38, the warning contents determination part 94 of the control unit 90 predicts the control (driving operation) of the vehicle driver. That is, the warning contents determination part 94 searches past travel information and past traffic information from the records memorized to the storage device 50 with based on similarity to current traffic information acquired by the traffic information acquisition part 93 and current travel information (at the time when the traffic information was acquired) acquired by the travel information acquisition part 92. Then the warning contents determination part 94 predicts, based on the operation information in association with similar traffic information and travel information in the control records memorized to the storage device 50 with the warning (a warning showing that braking operation is required) being provided, the control of the vehicle driver. In other words, the warning contents determination part 94 predicts what kind of control the vehicle driver performs at the present status of the subject vehicle (the speed and the position of the subject vehicle, the relative distance and relative speed to the immediate lead vehicle, the position of the immediate lead vehicle, the position and the braking state of the lead vehicle) with the warning being provided.

In step S39, the warning contents determination part 94 of the control unit 90 proceeds to step S40 when it is predicted that the control that the vehicle driver performs is the abrupt braking operation, or proceeds to step S37 when it is not predicted that the control that the vehicle driver performs is the abrupt braking operation.

Then, in step S40, the warning contents determination part 94 of the control unit 90 does not provides the warning. In other words, the warning contents determination part 94 determines not providing the warning as the warning contents. This is because, in view of the present status of the vehicle with the warning being provided, the driver is, in spite of the lack of necessity of the abrupt braking, predicted to perform the abrupt braking based on past control (a control record). In other words, a warning is not provided daringly when the warning likely serves as unfavorable support for the driver. In addition, the warning contents determined in step S37 and step S40 are memorized to the storage device 50. Then, the warning contents may be memorized to the storage device 50 in association with the vehicle condition and the driving operation.

Then, in step S42, the operation information acquisition part 91 of the control unit 90 acquires the operation information showing control (braking operation) performed in the travel condition at the time when the current traffic information is acquired from the brakes sensor 20.

In step S43, the memory 95 of the control unit 90 associates the traffic information, the travel information at the time of traffic information acquisition, and the operation information showing the control performed in the travel condition at the time when the traffic information has been acquired with the warning contents currently determined for memorizing the contents to the storage device 50.

When the vehicle driver actually drives the vehicle in the present embodiment in the manner described above, a support for safe driving suitable for the driver behind the wheel can be provided in terms of preparing the driver for the braking state of the lead vehicle.

In addition, when the necessity of the warning that is calculated based on the acquired traffic information and the travel information at the time when the traffic information has been acquired is considered as mentioned above, a support for safe driving can be tailored for the vehicle driver more appropriately.

Further, though the past warning contents are considered, and, in the above-mentioned second embodiment, the warning contents may be determined differently. That is, when the traffic information is acquired, the goal of the present invention is achieved by searching the traffic information and the travel information similar to the traffic information and the travel information at the time of traffic information acquisition from the storage device 50, and determining the warning contents according to the operation information associated with the similar traffic information and travel information.

However, the above assumption, that is, the driving operation of the driver, may be changed depending on the warning contents. Therefore, the consideration of the past warning contents may be employed to improve the support for the safe driving in a tailored manner for the actual driver.

In addition, though the examples described above are focused on the safe driving support for coping with the traffic signal and the lead vehicles, the safe driving support for different object may also be provided as long as the following components are provided. That is, when the traffic information acquisition unit to acquire traffic information in the outside of the vehicle, travel information acquisition unit to acquire travel information about the travel condition of the vehicle, the operation information acquisition unit to acquire operation information about the driving operation of the vehicle driver, the storage unit to store the traffic information and the travel information at the time of traffic information acquisition in association with the operation information showing the driving operation performed in the travel condition at the time of traffic information acquisition, and the warning contents determination unit that determines the warning contents according to the operation information that is associated with the traffic information and the travel information after searching and retrieving the traffic information and travel information from the storage unit based on the similarity to the traffic information and the travel information at the time of the traffic information acquisition upon having the traffic information in the first place, are provided, the advantageous effect of the present invention for supporting the safe driving is effected.

Such changes and modifications are to be understood as being within the scope of the present invention as defined by the appended claims.

What is claimed is:

1. A warning apparatus for use in a vehicle comprising:

a traffic information acquisition unit capable of acquiring traffic information of outside of the vehicle;

a travel information acquisition unit capable of acquiring travel information regarding a travel condition of the vehicle;

an operation information acquisition unit capable of acquiring operation information regarding a driving operation by a driver of the vehicle;

a storage unit capable of storing the traffic information in association with the travel information at a time of acquiring the traffic information and the operation information representative of the driving operation on the travel condition at the time of acquiring the traffic information; and a warning contents determination unit capable of determining warning contents according to the operation information in association with the traffic information and travel information, wherein, when the traffic information is acquired, the warning contents determination unit determines the warning contents after searching similar traffic information and similar travel information from information stored in the storage unit by referring to the acquired traffic information and the travel information at the time of acquiring the traffic information.

2. The warning apparatus of claim 1, wherein the traffic information acquisition unit acquires the traffic information that includes a remaining time of a green light of a traffic signal, the travel information acquisition unit acquires the travel information that includes a speed of the vehicle and a distance from a current position of the vehicle to the traffic signal, the operation information acquisition unit acquires the operation information that includes an acceleration operation and a deceleration operation, and the warning contents determination unit determines the warning contents based on the acceleration or deceleration operation in the operation information that is in association with the similar traffic information and the similar travel information.

3. The warning apparatus of claim 1, wherein the storage unit stores determined warning contents at the time of acquiring the traffic information in association with the traffic information, the travel information and the operation information, and the warning contents determination unit determines the warning contents in consideration of past warning contents stored in the storage unit when the traffic information is acquired.

4. The warning apparatus of claim 3, wherein the warning contents determination unit determines whether the traffic signal is safely passable by the vehicle based on the remaining time of the green light of the traffic signal, the speed of the vehicle, and the current position of the vehicle when the traffic information is acquired, and the warning contents determination unit determines the warning contents in consideration of a determination result.

5. The warning apparatus of claim 1, wherein the traffic information acquisition unit acquires the traffic information that includes a lead vehicle position and a lead vehicle brake condition, the travel information acquisition unit acquires the travel information that includes the vehicle speed and position together with a relative distance, a relative speed and a position of an immediate lead vehicle, the operation information acquisition unit acquires the operation information that includes braking operation, and the warning contents determination unit determines the warning contents based on whether a brake operation in the operation information that is in association with the similar traffic information and the similar travel information.

6. The warning apparatus of claim 5, wherein the warning contents determination unit determines whether the brake operation is required based on the lead vehicle position, the lead vehicle brake condition together with the vehicle speed and position as well as the immediate lead vehicle relative distance/speed, the position of the immediate lead vehicle, when the traffic information is acquired, and the warning contents determination unit determines the warning contents only when the brake operation is determined to be required.

7. The warning apparatus of claim 5, wherein the storage unit stores the determined warning contents at the time of acquiring the traffic information in association with the traffic information, the travel information and the operation information, and the warning contents determination unit determines the warning contents in consideration of past warning contents stored in the storage unit when the traffic information is acquired.

8. The warning apparatus of claim 1 further comprising:

a warning necessity calculation unit capable of calculating necessity of warning based on the acquired traffic information and the travel information at the time of acquiring the traffic information when the traffic information is acquired, wherein the warning contents determination unit determines the warning contents in consideration of a calculation result of the warning necessity calculation unit.

* * * * *